(12) United States Patent
Mohan et al.

(10) Patent No.: US 9,762,388 B2
(45) Date of Patent: Sep. 12, 2017

(54) SYMMETRIC SECRET KEY PROTECTION

(71) Applicant: Honeywell International Inc., Morristown, NJ (US)

(72) Inventors: Apurva Mohan, Maple Grove, MN (US); Paul Popowski, Lake Mills, WI (US)

(73) Assignee: Honeywell International Inc., Morris Plains, NJ (US)

( * ) Notice: Subject to any disclaimer, the term of this patent is extended or adjusted under 35 U.S.C. 154(b) by 122 days.

(21) Appl. No.: 14/548,218

(22) Filed: Nov. 19, 2014

(65) Prior Publication Data
US 2016/0142205 A1    May 19, 2016

(51) Int. Cl.
  *H04L 9/00*    (2006.01)
  *H04L 9/08*    (2006.01)

(52) U.S. Cl.
  CPC .......... *H04L 9/0869* (2013.01); *H04L 9/0872* (2013.01); *H04L 9/0891* (2013.01)

(58) Field of Classification Search
  CPC .... H04L 9/0869; H04L 9/0872; H04L 9/0891
  See application file for complete search history.

(56) References Cited

U.S. PATENT DOCUMENTS

| | | | | |
|---|---|---|---|---|
| 6,708,273 B1* | 3/2004 | Ober | ................ | G06F 8/60 713/189 |
| 7,229,009 B1* | 6/2007 | Parsons | ................ | G06Q 20/341 235/379 |
| 7,721,951 B1* | 5/2010 | Parsons | ................ | G06Q 20/341 235/379 |
| 2002/0080958 A1* | 6/2002 | Ober | ................ | G06F 8/60 380/44 |
| 2004/0249817 A1* | 12/2004 | Liu | ................ | H04L 63/0428 |
| 2008/0031446 A1* | 2/2008 | Suga | ................ | G11B 20/00086 380/44 |
| 2008/0165955 A1* | 7/2008 | Ibrahim | ................ | G06F 7/725 380/30 |
| 2009/0144562 A9* | 6/2009 | Peterson | ............ | G06F 21/6218 713/193 |
| 2010/0262688 A1* | 10/2010 | Hussain | ............ | H04L 63/1433 709/224 |
| 2010/0306538 A1* | 12/2010 | Thomas | ................ | H04L 9/0844 713/168 |
| 2011/0252243 A1* | 10/2011 | Brouwer | ............ | H04L 9/0838 713/189 |
| 2012/0011373 A1* | 1/2012 | Hakkarainen | ........... | G06F 21/10 713/193 |
| 2012/0278633 A1* | 11/2012 | Frieder | ............ | G06F 21/6245 713/189 |
| 2013/0031374 A1* | 1/2013 | Thom | ................ | G06F 21/57 713/189 |
| 2013/0067582 A1* | 3/2013 | Donovan | ............ | H04L 63/08 726/25 |

(Continued)

*Primary Examiner* — Techane Gergiso
(74) *Attorney, Agent, or Firm* — Schwegman Lundberg & Woessner, P.A.

(57) ABSTRACT

A system and method includes obtaining a secret key at a processor of a device, obtaining a salt and an environmental variable, generating a cryptographically transformed derived key via the processor of the device using the secret key, the salt, and the environmental variable, storing the derived key in a memory of the device, and using the derived key for cryptographic communications via a network with another device.

16 Claims, 4 Drawing Sheets

(56) References Cited

U.S. PATENT DOCUMENTS

| | | | |
|---|---|---|---|
| 2013/0290734 A1* | 10/2013 | Branton | H04L 9/0869 713/189 |
| 2014/0068246 A1* | 3/2014 | Hartley | G09C 1/00 713/155 |
| 2014/0122901 A1* | 5/2014 | Bilke | G06F 21/60 713/193 |
| 2015/0006789 A1* | 1/2015 | Buer | G06F 21/44 711/103 |
| 2015/0106626 A1* | 4/2015 | Kremp | H04L 63/06 713/189 |
| 2015/0134942 A1* | 5/2015 | Novak | G06F 21/575 713/2 |
| 2016/0119312 A1* | 4/2016 | Armstrong | G06F 21/45 713/171 |
| 2016/0125416 A1* | 5/2016 | Spencer | G06Q 20/40145 705/71 |

\* cited by examiner

SYMMETRIC SECRET KEY PROTECTION

BACKGROUND

Many network connected devices use a symmetric key for trust management in networks. These devices range from embedded controllers to thermostats to internet of things devices connecting to web based systems like data centers, private clouds, or even public clouds. One of the main vulnerabilities in many of these security mechanisms is that the web based systems have to maintain a copy of the symmetric key to verify authentication or encryption based on the key. Without loss of generality, assume that the devices are connected to a private or public cloud infrastructure. A database in the cloud will be used to store the secret keys of all the devices connecting to it. The number of these devices can run into millions. If the secret key database is lost, the only way to restore trusted communications is to restore a new key on each device, which can be very resource consuming, time consuming, and sometime cost prohibitive. One approach to solve this problem is to encrypt the database using a symmetric key and decrypt each secret key from the database when a device sends an encrypted message. Although this approach does provide some security, it does not provide a comprehensive solution against cyber attacks for several reasons. Typically when the data center or cloud setting is compromised, the adversary has access to all the online information. As such, it is not surprising that he will have access to the keys used for encrypting the database as well. In environments where very low response times are desired, decrypting each key once a message is received may not be a desirable solution. Many times that trust is brokered by the cloud by the communicating end points that are connected wirelessly. There have been a number of attacks in the recent past on companies where attackers have stolen security related secrets stored in secure databases.

SUMMARY

A system and method includes obtaining a secret key at a processor of a device, obtaining a salt and an environmental variable, generating a cryptographically transformed derived key via the processor of the device using the secret key, the salt, and the environmental variable, storing the derived key in a memory of the device, and using the derived key for cryptographic communications via a network with another device.

A machine readable storage device has instructions for execution by a processor of the machine to perform a method. The method includes obtaining a secret key at a processor of a device, obtaining a salt and an environmental variable, generating a cryptographically transformed derived key via the processor of the device using the secret key, the salt, and the environmental variable, storing the derived key in a memory of the device, and using the derived key for cryptographic communications via a network with another device.

A device includes a processor and a memory device coupled to the processor and having a program stored thereon for execution by the processor to obtain a secret key at the processor, obtain a salt and an environmental variable, generate a cryptographically transformed derived key via the processor of the device using the secret key, the salt, and the environmental variable, store the derived key in the memory device, and use the derived key for cryptographic communications via a network with another device.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Secret keys that are stored in a web based network or cloud type of environment are exposed to many attack vectors depending on the deployment. Vulnerabilities include attackers penetrating organizations to steal authentication information. The problem with secret keys is that once they are stolen, all the devices have to be updated with a new key burnt into them. This process could be quite expensive and effort intensive. Authentication and access control to protect secret keys is implemented in most systems.

A fundamentally different approach for protecting secret keys is provided in various embodiments. Cryptographic transformation of secret keys is performed so that an attacker's effort to brute force the keys is exponential. The keys may be derived in such a way that once a breach is detected, an administrator can generate new derived keys and replace the old derived keys from the database with new ones. This way the actual secret keys that are burnt in the device are not affected at all and don't need to be replaced. Also, the approach works well with business continuity as there is minimal disruption in operations due to compromise of derived keys.

Figure 1:
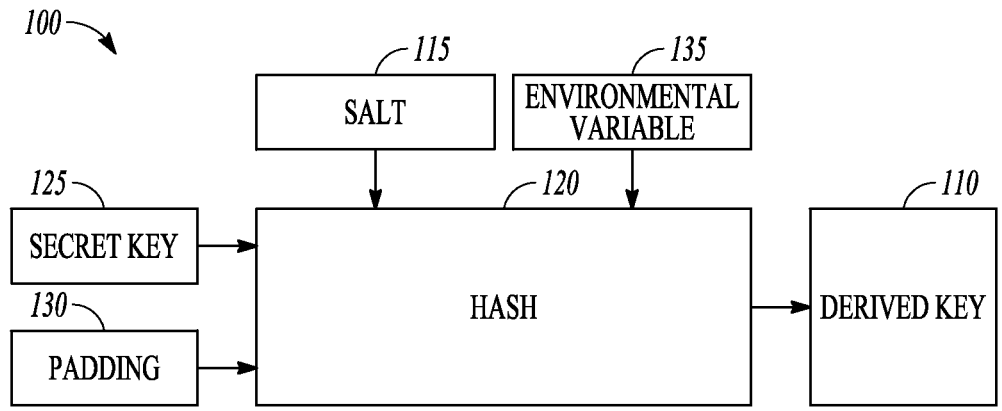
FIG. 1 is a block diagram illustrating generation of derived keys for symmetric key cryptographic communication between two devices according to an example embodiment.

FIG. 1 is a block diagram illustrating a method and system 100 for generating derived keys 110. The method may be implemented at both the device level and the server level to generate a different derived key 110 for each device. In one embodiment, the derived key 110 also may be used to identify the device, as it may be unique for each device.

Figure 2:
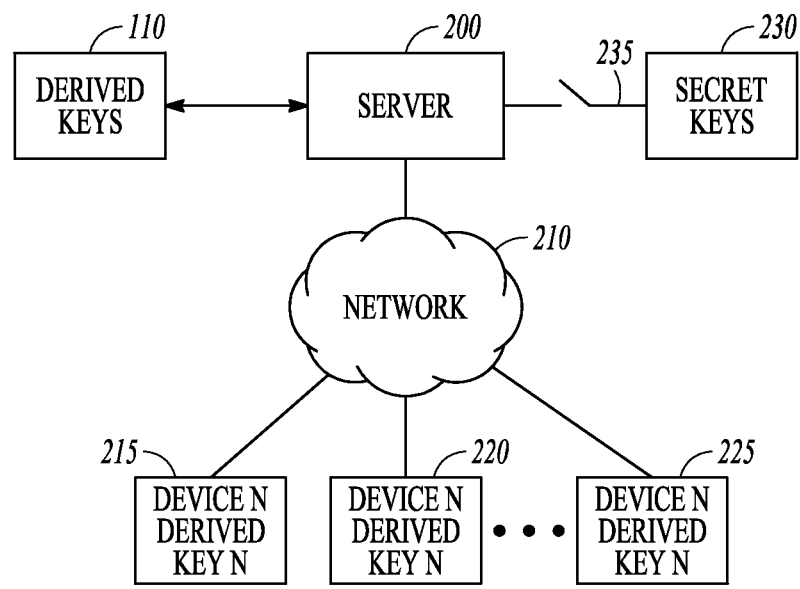
FIG. 2 is a block diagram illustrating devices communicating using derived keys for symmetric key cryptographic communications according to an example embodiment.

In one embodiment, a 64 bit (or more) long salt 115 may be used as input to a hashing algorithm 120. SHA-256 or AES Hash algorithms may be used in one example embodiment, with other hashing algorithms used in further embodiments. The key derivation method is not dependent on a particular cryptographic hash function. The salt may be a random number in some embodiments. As an example, a secret key 125 may be assumed to be 256 bits long. If the length is less than 256 bits, padding 130 may be done to increase the length to 256 bits or longer in further embodiments. An environmental variable 135 is used as a dynamic parameter in case subsequent derived keys are to be created for replacing stale derived keys. Once the derived keys 110 are generated, the secret keys 125 may be backed up in an off-line storage and removed from the server such that they are not available online from the server. The method is not dependent on the length of any input variables like secret keys, salt, padding, or environmental variable or output variables like derived key FIG. 2 is a block diagram illustrating a server 200 coupled via a network 210 to multiple devices 215, 220, and 225. Secret keys 230 are shown via a detachable connection 235, and are used with a salt and environmental variable which may be generated by server 200 or otherwise obtained, to generate derived keys. A separate secret key and hence derived key is used for each device to facilitate encrypted communications between the server 210 and the devices 215, 220, and 225.

The devices 215, 220, and 225 may have a secret key stored within them when shipped to a customer or end user. The secret key may be stored in a protected memory in some embodiments to make it more difficult to obtain by an attacker. The salt and environmental variable may be provided via the server and used by the device in a processor or other circuitry to perform the hashing to arrive at the same derived key as derived by the server 200. Each device and the server use the same key to communicate, providing a secure communication mechanism. With the secret keys switched out of the server via connection 235, the secret keys may not be accessed via the server once the derived keys are generated. Thus, while an attacker may be able to obtain a secret key from a single device by physically attacking the device, it would be extremely difficult to obtain the secret key for all devices from the server, as the server does not have access to the secret keys once the derived keys are generated. The secret keys will be backed up in an off-line storage.

Figure 3:
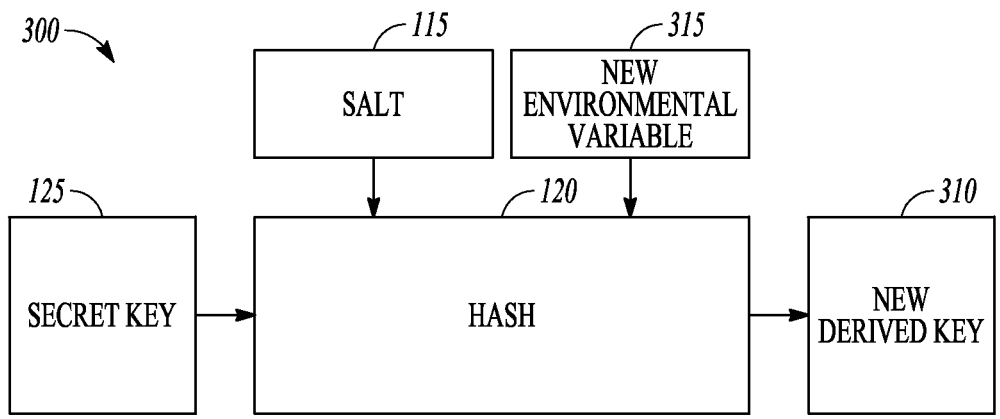
FIG. 3 is a block diagram illustrating generation of further derived keys according to an example embodiment.

A further or subsequent derived key may be generated as illustrated in FIG. 3 which is a block diagram of a system and method 300 for generating new derived keys 310 based on the secret keys 125. Numbering of like components is the same as that shown in FIG. 1. the secret key 125 is again used as an input to the hashing algorithm 120 in FIG. 3. The salt 115 and a new environmental variable 315 may also be used to generate the new derived key 310.

Depending on requirements, various groups of devices may be part of field deployments. In order to provide high level of security and to comply with organizational policies, it may be required that derived keys be generated for some groups of devices more frequently than others.

The secret keys in the web or server system are protected from a large scale compromise of secret key database by being stored off the network for most of the time. Various embodiments protect secret key disclosure in the face of several different attack scenarios. If the derived keys database is compromised along with the salt value, the administrator may use the secret keys to derive a new set of derived keys using a new environmental parameter. This parameter can be something simple like a timestamp. With the old derived keys, the attacker will not be able to recover the secret keys because to do so, the attacker will either have to reverse hash functions like SHA-256 hash function or brute force long keys like 256-bit cryptographic keys, both of which are known to be computational hard/infeasible problems.

If a single secret key is compromised by an adversary by compromising a single device, then the effect of the compromise is not large scale. Since the impact is limited to manipulating that single device's operations it does not have a widespread impact.

With the derived keys, the attacker will not be able to recover the secret keys because to do so, the attacker will either have to reverse hash functions like SHA-256 hash function or brute force long keys like 256-bit cryptographic keys, both of which are known to be computational hard/infeasible problems.

As the keys age, they become more vulnerable to compromise because an adversary can launch a known cipher text attack if enough encrypted packets are known to the adversary. To counter this attack, the derived secret key can be updated periodically. The web server can use a new environmental variable to generate new derived keys and share the new environmental variable with the device. The device will also calculate the same new derived key and symmetric cryptography can be achieved.

Libraries of the hash function like SHA-256 hash function can be implemented in the device and the server side to derive new keys. The secret keys can be archived in off-line storage.

In some embodiments, the use of derived keys can be realized in web based infrastructure with little or no change. The system does not need to involve the user at all to implement this mechanism. This is sharply in contrast to current approaches. Symmetric cryptography is utilized, allowing additional functions to be implemented using standard libraries.

Keys and key sizes can be updated anytime without any impact on the user. For example, if hardware advancements make it easier to brute force 256 bit keys the system can always be migrated to 512 bit or 1024 bit keys. The hashing algorithms or cryptographic hardware can also be updated without any impact on user or normal system operation modulo the downtime required for the upgrade.

The use of derived keys may also provide a new functionality of changing the symmetric cryptographic keys when they become aged. This cannot be achieved by the original secret keys previously being used. The use of derived keys may provide a secure procedure for attack recovery after the attackers have compromised the symmetric key database. The generation of further derived keys is quite efficient from current approaches because it does not need the field devices to be updated in the attack recovery procedure. The provision of a new environmental variable enables generation of new derived keys.

Figure 4:
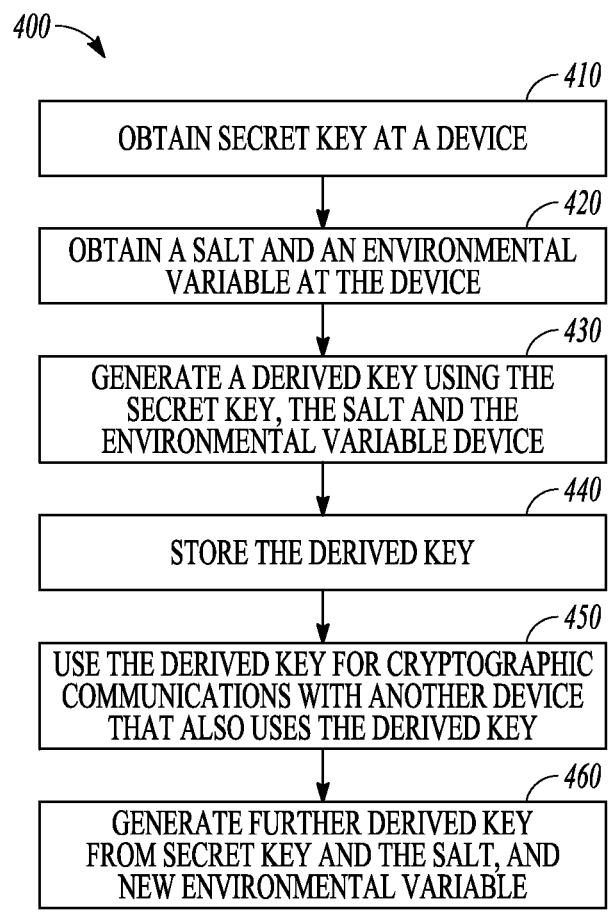
FIG. 4 is a flowchart illustrating a method of generating derived keys according to an example embodiment.

FIG. 4 is a flowchart illustrating a method 400 of derived key generation. Method 400 may be implemented at both the server and device to generate the same derived keys for use in symmetric cryptographic communications. A secret key is obtained at 410. The secret key may be installed in the device at a manufacturer or distributor in some embodiments and provided to the device, which may be either or both the server and a remote device coupled to the server. At 420, a salt and an environmental variable are obtained at the device. The salt and environmental variable may be generated by the server or received by the server, and may be provided to a remote device via a network connection in some embodiments, or even provided to the device at manufacture or on distribution.

At 430, a derived key is generated using the secret key, the salt, and the environmental variable using a hash function. Both the server and remote device may generate the derived key using the same hash function. The derived key is stored for use at 440 at each device, including the server, and used at 450 for cryptographic communications between two devices that use the same key. With multiple remote devices coupled to the server, a different secret key may be used, resulting in a different derived key for use in communicating with each different remote device. The server stores all the derived keys in one embodiment, and removes the corresponding secret keys from network accessible storage once the derived keys are generated to minimize the amount of time the secret keys are potentially exposable via attack through the network.

In the event that a new key is needed to ensure secure communications, at 460, each device may generate a further derived key based on the secret key, the salt, and a new environmental variable. The environmental variable may be changed and sent to the devices, including both the server, which may instigate the generation of the further derived key as well as provide the new environmental variable, and the remote device or devices. This allows a change of keys used for communications after a significant volume of communications has made it less difficult to reverse engineer the previously used derived key. The generation of a further derived key may be instigated based on a selected number of communications or time using the previous key, or upon discovery of an increased number or success of attacks.

Figure 5:
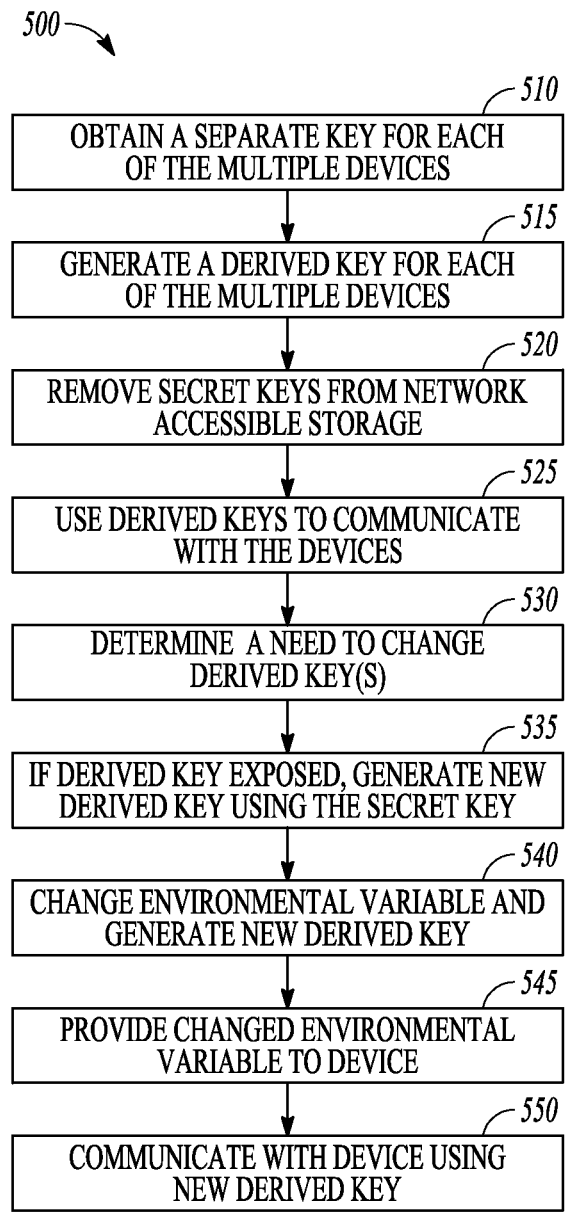
FIG. 5 is a flowchart illustrating a method of managing keys for communicating with multiple remote devices according to an example embodiment.

FIG. 5 is a flowchart illustrating a method 500 of managing keys by a server or web based system for communicating with multiple remote devices. At 510, a separate secret key for each of multiple devices is obtained. The secret keys may be received from an administrator or otherwise generated by the server, such as randomly generated. At 515, the server generates a derived key for each of the multiple devices. The secret keys are then removed from network accessible storage at 520. In one embodiment, the derived keys are generated in batch, with all the secret keys present in the server. The server may be removed or otherwise disconnected from the network while present in the server for generation of the derived keys if desired for additional security and reduction of chances of successful attack to obtain the secret keys. The secret keys may be stored on a memory stick, or other storage device that is not connected to the network when not being used to generate the derived key. In further embodiments, the hashing function may be done on a separate computer not connected to the network, with the derived keys then being provided to the server for use in communicating with the devices at 525 using the derived keys as symmetric keys.

At 530, a need to change a derived key is determined. This may occur when an attacker is found to have obtained the derived key, or after a predetermined amount of time or after a predetermined number of communications have occurred using the derived key, which may make it less difficult to reverse engineer the derived key. At 535, if derived keys are exposed, the method generates new derived keys from offline backup of secret keys. The server may provide the new derived key to the device, or it may be provided otherwise so that the device may also generate a new derived key for use in communications.

At 540, in one embodiment, a new environmental variable is obtained and provided to the remote device at 545. The new derived key is then generated at both the server and remote device and used to communicate at 550.

Figure 6:
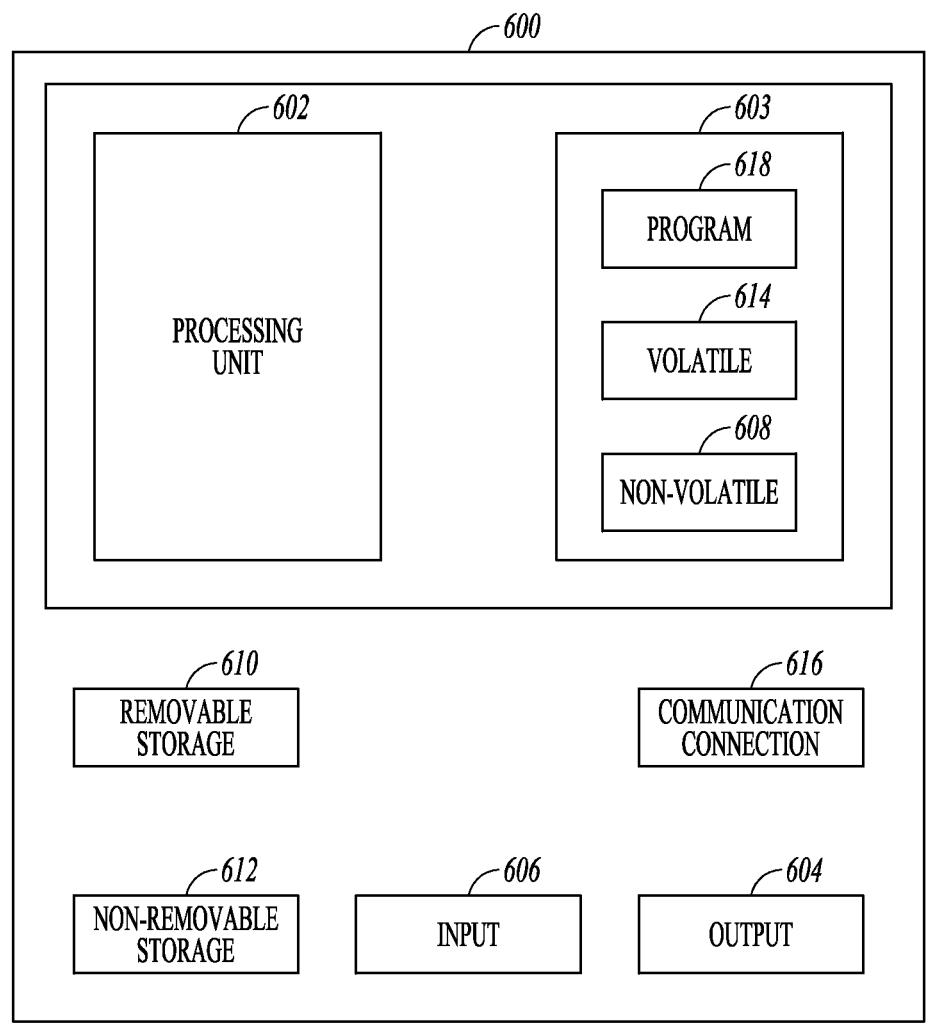
FIG. 6 is a block diagram of components which may be used to implement one or more methods, devices, and servers according to example embodiments.

FIG. 6 is a block schematic diagram of a computer system 600 to implement methods according to example embodiments. All components need not be used in various embodiments. One example computing device in the form of a computer 600, may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, or other computing device including the same or similar elements as illustrated and described with regard to FIG. 6. Networked devices may also include system 600 components utilized to generate keys and communicate, as well as perform other functions associated with multiple different kinds of devices. Some such devices may include devices referred to in the phrase "Internet of devices." Further, although the various data storage elements are illustrated as part of the computer 600, the storage may also or alternatively include cloud-based storage accessible via a network, such as the Internet.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 602 of the computer 600. A hard drive, CD-ROM, and RAM are some examples of articles including a non-transitory computer-readable medium such as a storage device. The terms computer-readable medium and storage device do not include carrier waves. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

Examples

1. A method comprising:
    obtaining a secret key at a processor of a device;
    obtaining a salt and an environmental variable;
    generating a cryptographically transformed derived key via the processor of the device using the secret key, the salt, and the environmental variable;
    storing the derived key in a memory of the device; and
    using the derived key for cryptographic communications via a network with another device.

2. The method of example 1 wherein the device is a server device coupled to communicate with multiple devices, wherein the server device generates a derived key from a different secret key for each of the multiple devices.

3. The method of example 2 and further comprising removing the secret keys from storage accessible via the network following generation of the derived keys.

4. The method of any of examples 1-3 wherein generating a cryptographically transformed derived key comprises generating the key via a hashing algorithm.

5. The method of example 4 wherein if the secret key is less than 256 bits long, adding padding bits to the secret key such that it is at least 256 bits long.

6. The method of any of examples 4-5 wherein the salt is a 64 bit or more random number.

7. The method of any of examples 1-6 wherein the cryptographic communications are with a server that generated the derived key in the same manner.

8. The method of any of examples 1-7 wherein the environmental variable is a time stamp.

9. The method of any of examples 1-8 and further comprising:
    obtaining a second environmental variable;
    generating a second derived key based on the secret key, the salt, and the second environmental variable for use in secure communications; and
    using the second derived key for cryptographic communications via a network with another device.

10. A machine readable storage device having instructions for execution by a processor of the machine to perform a method comprising:
    obtaining a secret key at a processor of a device;
    obtaining a salt and an environmental variable;
    generating a cryptographically transformed derived key via the processor of the device using the secret key, the salt, and the environmental variable;
    storing the derived key in a memory of the device; and
    using the derived key for cryptographic communications via a network with another device.

11. The machine readable storage device of example 10 wherein the device is a server device coupled to communicate with multiple devices, wherein the server device generates a derived key from a different secret key for each of the multiple devices.

12. The machine readable storage device of example 11 and further comprising removing the secret keys from storage accessible via the network following generation of the derived keys.

13. The machine readable storage device of any of examples 10-12 wherein generating a cryptographically transformed derived key comprises generating the key via a hashing algorithm.

14. The machine readable storage device of any of examples 10-13 and further comprising:
    obtaining a second environmental variable;
    generating a second derived key based on the secret key, the salt, and the second environmental variable for use in secure communications; and
    using the second derived key for cryptographic communications via a network with another device.

15. A device comprising:
    a processor; and
    a memory device coupled to the processor and having a program stored thereon for execution by the processor to:
    obtain a secret key at the processor;
    obtain a salt and an environmental variable;
    generate a cryptographically transformed derived key via the processor of the device using the secret key, the salt, and the environmental variable;
    store the derived key in the memory device; and
    use the derived key for cryptographic communications via a network with another device.

16. The device of example 15 wherein the device is a server device coupled to communicate with multiple devices, wherein the server device generates a derived key from a different secret key for each of the multiple devices.

17. The device of example 16 wherein the processor further removes the secret keys from storage accessible via the network following generation of the derived keys.

18. The device of any of examples 15-17 wherein the cryptographically transformed derived key is generated via a hashing algorithm.

19. The device of example 18 wherein the secret key is at least 256 bits long and the salt is a 64 bit or more random number.

20. The device of any of examples 15-19 wherein the processor further:
    obtains a second environmental variable;
    generates a second derived key based on the secret key, the salt, and the second environmental variable for use in secure communications; and
    uses the second derived key for cryptographic communications via a network with another device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   obtaining a secret key at a processor of a first device, the secret key being unique to and burnt into a memory of a remote second device;
   obtaining a salt and a first device environmental variable;
   generating a cryptographically transformed derived symmetric key via the processor of the first device using the secret key, the salt, and the environmental variable;
   storing the derived symmetric key in a memory of the first device;
   sending the salt and the environmental variable from the first device to the remote second device, the remote second device to generate a copy of the derived symmetric key using the secret key, the salt, and the environmental variable, wherein the derived symmetric key and copy of the derived symmetric key enable symmetric cryptographic communications via a network between the first device and the remote second device;
   obtaining a second environmental variable in response to a determination that the derived symmetric key was compromised;
   generating a second derived symmetric key based on the secret key, the salt, and the second environmental variable for use in secure communications; and
   sending the second environmental variable from the first device to the remote second device, the remote second device to generate a copy of the second derived symmetric key using the secret key, the salt, and the second environmental variable, wherein the second derived symmetric key and copy of the derived symmetric key enable symmetric cryptographic communications via a network between the first device and the remote second device.

2. The method of claim 1 wherein the first device is a server device coupled to communicate with multiple devices, wherein the server device generates a derived key from a different secret key for each of the multiple devices.

3. The method of claim 2 and further comprising removing the secret keys from storage accessible via the network following generation of the derived keys.

4. The method of claim 1 wherein generating the cryptographically transformed derived symmetric key comprises generating the derived symmetric key via a hashing algorithm.

5. The method of claim 4 wherein if the secret key is less than 256 bits long, adding padding bits to the secret key such that it is at least 256 bits long.

6. The method of claim 4 wherein the salt is a 64 bit or more random number.

7. The method of claim 1 wherein the environmental variable is a time stamp.

8. A machine readable storage device having instructions for execution by a processor of the machine to perform a method comprising:
   obtaining a secret key at a processor of a first device, the secret key being unique to and burnt into a memory of a remote second device;
   obtaining a salt and a first device environmental variable;
   generating a cryptographically transformed derived symmetric key via the processor of the first device using the secret key, the salt, and the environmental variable;
   storing the derived symmetric key in a memory of the first device; and
   sending the salt and the environmental variable from the first device to the remote second device, the remote second device to generate a copy of the derived symmetric key using the secret key, the salt, and the environmental variable, wherein the derived symmetric key and a copy of the derived symmetric key enable symmetric cryptographic communications via a network between the first device and the remote second device;
   obtaining a second environmental variable in response to a determination that the derived symmetric key was compromised;
   generating a second derived symmetric key based on the secret key, the salt, and the second environmental variable for use in secure communications; and
   sending the second environmental variable from the first device to the remote second device, the remote second device to generate a copy of the second derived symmetric key using the secret key, the salt, and the second environmental variable, wherein the second derived symmetric key and a copy of the derived symmetric key enable symmetric cryptographic communications via a network between the first device and the remote second device.

9. The machine readable storage device of claim 8 wherein the first device is a server device coupled to communicate with multiple devices, wherein the server device generates a derived key from a different secret key for each of the multiple devices.

10. The machine readable storage device of claim 9 and further comprising removing the secret keys from storage accessible via the network following generation of the derived keys.

11. The machine readable storage device of claim 8 wherein generating the cryptographically transformed derived symmetric key comprises generating the derived symmetric key via a hashing algorithm.

12. A device comprising:
   a processor; and
   a memory device coupled to the processor and having a program stored thereon for execution by the processor to:
   obtain a secret key at a processor of a first device, the secret key being unique to and burnt into a memory of a remote second device;
   obtain a salt and a first device environmental variable;
   generate a cryptographically transformed derived symmetric key via the processor of the first device using the secret key, the salt, and the environmental variable;
   store the derived symmetric key in the memory device; and
   send the salt and the environmental variable from the first device to the remote second device, the remote second device to generate a copy of the derived symmetric key using the secret key, the salt, and the environmental variable, wherein the derived symmetric key and a copy of the derived symmetric key enable symmetric cryptographic communications via a network with between the first device and the remote second device;
   obtains a second environmental variable in response to a determination that the derived symmetric key was compromised;
   generates a second derived symmetric key based on the secret key, the salt, and the second environmental variable for use in secure communications; and
   sends the second environmental variable from the first device to the remote second device, the remote second device to generate a copy of the second derived symmetric key using the secret key, the salt, and the second environmental variable, wherein the second derived symmetric key and a copy of the derived symmetric key enable symmetric cryptographic communications via a network between the first device and the remote second device.

13. The device of claim 12 the first device is a server device coupled to communicate with multiple devices, wherein the server device generates a derived key from a different secret key for each of the multiple devices.

14. The device of claim 13 wherein the processor further removes the secret keys from storage accessible via the network following generation of the derived keys.

15. The device of claim 12 wherein the cryptographically transformed derived symmetric key is generated via a hashing algorithm.

16. The device of claim 15 wherein the secret key is at least 256 bits long and the salt is a 64 bit or more random number.

\* \* \* \* \*